(12) United States Patent
Henkel et al.

(10) Patent No.: US 7,532,678 B2
(45) Date of Patent: May 12, 2009

(54) METHOD FOR TRANSMITTING DATA BY MULTI-CARRIER MODULATION

(75) Inventors: Werner Henkel, Achim (DE); Valentin Zrno, Vienna (AT)

(73) Assignee: Infineon Technologies AG, Munich (DE)

( * ) Notice: Subject to any disclaimer, the term of this patent is extended or adjusted under 35 U.S.C. 154(b) by 693 days.

(21) Appl. No.: 10/489,065

(22) PCT Filed: Sep. 11, 2002

(86) PCT No.: PCT/AT02/00262

§ 371 (c)(1),
(2), (4) Date: Aug. 4, 2004

(87) PCT Pub. No.: WO03/026240

PCT Pub. Date: Mar. 27, 2003

(65) Prior Publication Data

US 2004/0264508 A1    Dec. 30, 2004

(30) Foreign Application Priority Data

Sep. 14, 2001  (AT) .............................. A 1451/2001

(51) Int. Cl.
    *H04L 27/10* (2006.01)
(52) U.S. Cl. ........................ 375/275; 375/259; 375/271; 375/272
(58) Field of Classification Search ................... 375/275
    See application file for complete search history.

(56) References Cited

U.S. PATENT DOCUMENTS

| | | | | |
|---|---|---|---|---|
| 5,754,592 A | * | 5/1998 | Flowers et al. | 375/243 |
| 6,175,551 B1 | * | 1/2001 | Awater et al. | 370/210 |
| 6,314,146 B1 | * | 11/2001 | Tellado et al. | 375/346 |
| 6,845,082 B2 | * | 1/2005 | Bourget et al. | 370/210 |
| 7,110,445 B2 | * | 9/2006 | Melsa | 375/224 |
| 7,136,423 B1 | * | 11/2006 | Duvaut et al. | 375/260 |
| 7,295,509 B2 | * | 11/2007 | Laroia et al. | 370/208 |
| 2001/0022777 A1 | * | 9/2001 | Bourget et al. | 370/210 |
| 2002/0191705 A1 | * | 12/2002 | Melsa et al. | 375/295 |

OTHER PUBLICATIONS

J Tellado, JM Cioffi—Globecom'99, 1999, Peak power reduction for multicarrier transmission , Information Systems Laboratory, Stanford University Stanford.*

(Continued)

*Primary Examiner*—Shuwang Liu
*Assistant Examiner*—Kenneth Lam
(74) *Attorney, Agent, or Firm*—Ladas & Parry LLP

(57) ABSTRACT

During data transmission by multi-carrier modulation of data blocks modulated by Inverse Discrete Fourier Transformation (IDFT), carriers that are not occupied by data are occupied in such a way as to generate temporal functions that, after filtration, are Dirac-like temporal functions that reach maxima in an oversampled temporal resolution of different, preferably adjacent positions. A pair of the oversampled Dirac-like temporal functions and corresponding filter input functions that are not oversampled is iteratively selected. The pair is displaced to a position of a peak value resulting from the data occupation of the remaining carriers, subtracted from the oversampled Dirac-like temporal functions after being weighted and, as iterative modifications, applied in parallel to the Dirac-like temporal functions and a corresponding temporal signal without oversampling and without filtration.

17 Claims, 3 Drawing Sheets

Figure 1:
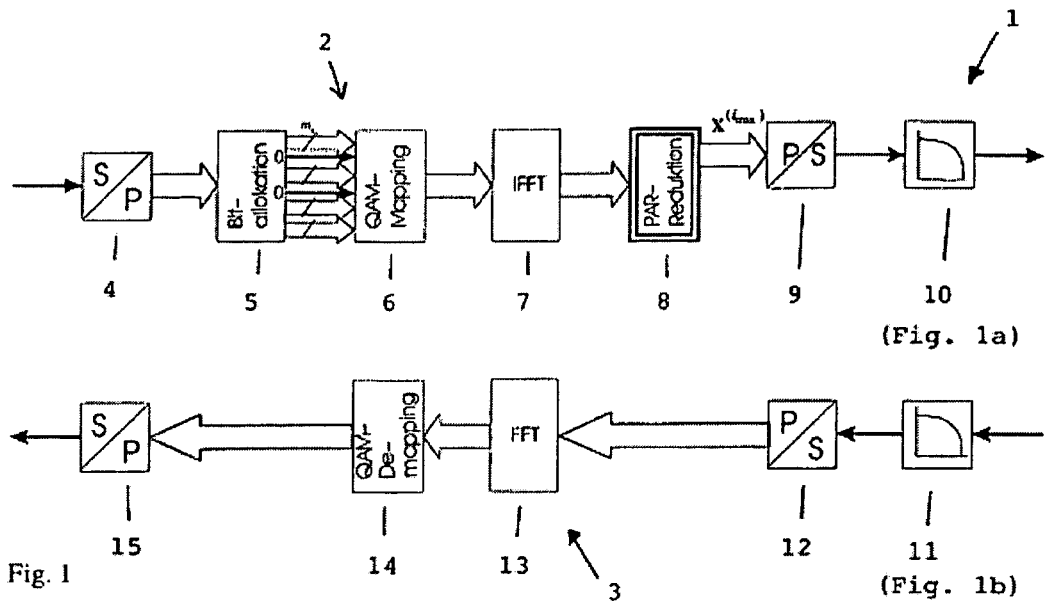

44 – seek $m_1 | \tilde{x}^{(i)}_m |$ for which $| \tilde{x}^{(i)}_m | = \max_n | \tilde{x}^{(i)}_n |$
nein = no
ja = yes

OTHER PUBLICATIONS

W Henkel, V Zrno, PAR reduction revisited: an extension to Tellado's method, p. 1.6 th International OFDM-Workshop (InOWo) 2001, Hamburg 31-1.*

Hill, G., et al., Cyclic Shifting and Time Inversion of Partial Transmit Sequences to Reduce the Peak-to-Average Power Ratio in OFDM, *IEEE 2000*, pp. 1256-1259.

Muller, Stefan H., et al., A Comparison of Peak Power Reduction Schemes for OFDM; *Global Telecommunications Conference*, 1997, pp. 1-5.

Tellado, Jose, et al., Efficient Algorithms for Reducing PAR in Multicarrier Systems; *Information Theory, 1998, Proceedings 1998 IEEE International Symposium on Cambridge, MA*, p. 191.

Salvekar, Atul A., et al., "Peak-to-Average Power Ratio Reduction for Block Transmission systems in the Presence of Transmit Filtering", *2001 IEEE International Conference on Communications, Conference Record*, Helsinky, Finland, Jun. 11-14, 2001, pp.175-178.

Cimini, Leonard J., et al., Peak-to-Average Power Ratio Reduction of an OFDM Signal Using Partial Transmit Sequences, *1999 IEEE International Conference on Communications Conference Record*, Vancouver, CA, Jun. 6-10, 1999, pp. 511-515.

* cited by examiner

5 – Bit allocation

8 – PAR-Reduction legend: relative frequency distribution

20 – carrier selection and setting at constant value
25 – seek $m_l |\tilde{p}_m|$ for which $|\tilde{p}_m| = \max_n |\tilde{p}_n|$ 44 – seek $m_l |\tilde{x}^{(i)}_m|$ for which $|\tilde{x}^{(i)}_m| = \max_n |\tilde{x}^{(i)}_n|$
nein = no
ja = yes (top) – Normalized sampled values (bottom) – Number of sampled values (time)

METHOD FOR TRANSMITTING DATA BY MULTI-CARRIER MODULATION

The invention concerns a method for transmission of data by multicarrier modulation, in which the data at the transmitter side are assembled into blocks and are modulated block by block with the Inverse Discrete Fourier Transform (IDFT), and in which several carriers, i.e., components of the DFT blocks, are reserved, being not occupied with data, and these carriers are occupied in such a way as to generate a great many temporal functions, which after filtration exhibit Dirac-like characteristics.

At the receiver side, the data signals are demodulated block by block with the Discrete Fourier Transform (DFT).

Such a transmission of data with multicarrier transmission, using a plurality of carrier frequencies, is used, for example, in wire-line or also wireless areas, for broadcast sy0stems and for access to data networks such as the Internet. One problem here is the resulting high peak values of the temporal signal, which is reduced by iteration.

Quite generally, systems have been in use for some time now in the field of digital signal processing that enable a high-rate digital data transmission. One technique which is becoming increasingly important in recent time is the multi-carrier transmission mentioned here, which is also known as "Discrete Multitone (DMT)" transmission or "Orthogonal Frequency Division Multiplex (OFDM)" transmission. In multicarrier transmission, the data stream being transmitted is broken up into many parallel partial streams, which are transmitted independently of each other in frequency-division multiplex.

In practice, the signal decomposition is accomplished by an IFFT (Inverse Fast Fourier Transform), wherein the components of the vector in the DFT (Discrete Fourier Transform) domain are occupied by signal points of a QAM (Quadrature Amplitude Modulation). The IFFT produces a signal with block structure in the temporal domain. In order to avoid an inter-block interference, a cyclical prefix, the so-called Guard Interval, is used during DMT or OFDM transmission. In this case, the frame end cyclically precedes the block in time. The convolution with the channel pulse response then appears as a cyclical convolution, which can be described by a simple multiplication with complex coefficients in the DFT domain. The equalization is simplified, which can now occur in the DFT domain and then corresponds to a simple AGC (Automatic Gain Control) for each carrier.

By superimposing very many individual carriers in this technique, the individual carriers can briefly add up to very high peak values. According to the law of large numbers, an almost Gauss-distributed temporal signal arises. The transient high amplitudes represent the main drawback of multi-carrier transmission, since analog circuit parts and analog-digital converters have to be designed for these high amplitudes in their modulation range and in their dynamics or resolution. This also requires high operating voltages and thus further leads to a high power loss. The literature contains a number of proposals for reducing the peak to added-value ratio (also known as the PAR factor, PAR=Peak-to-Average Ratio, or the crest factor), and the technique to be described herein is based on a method of Jose Tellado, as described, for example, in Tellado, J., Cioffi, J. M., "PAR Reduction in Multicarrier Transmission Systems", Delayed Contribution ITU-T4/15, D.150 (WP1/15), Geneva, Feb. 9-20, 1998. A brief presentation of the principle also occurs in TELLADO, J.; CIOFFI, J. M. "Efficient algorithms for reducing PAR in multicarrier systems", Proceedings 1998 IEEE International Symposium on Information Theory (ISIT), 16-21 Aug. 1998, page 191.

Further proposals employ, for example, expanded QAM constellations at the carriers in order to provide redundancy for the peak value limiting. This requires a selection algorithm for the particular equivalent signal points of a constellation. We shall mention two publications on this, as examples, but it should be noted that the method involved in the invention provides redundancy in a different way and thus is not related to these methods. Constellation expansions have been proposed, e.g., in Chan-Soo Hwang, "A peak power reduction method for multicarrier transmission", IEEE International Conference on Communications, 2001 (ICC 2001), 11-14 Jun. 2001, Vol. 5, pp. 1496-1500; and in the standardization paper by Jose Tellado, John M. Cioffi, "PAR reduction with minimal or zero bandwidth loss and low complexity (98-173)", T1E1.4/98-173. Filter functions have been introduced in SALVEKAR, A. A.; ALDANA, C.; TELLADO, J.; CIOFFI, J. "Peak-to-average power ratio reduction for block transmission systems in the presence of transmit filtering", IEEE International Conference on Communications, 2001 (ICC 2001), 11-14 Jun. 2001, Vol. 1, pp. 175-178. However, this involved the joint treatment of several neighboring transmission frames in order to factor in marginal effects between IFFT symbols. But an embodiment with low complexity, such as is made possible by the Dirac-like functions with scaling and displacement, is not the topic of this essay. Thus, there also is no direct connection to the method involved here.

In the above-mentioned known method of Tellado, a temporal function with Dirac-like characteristics is employed. Such a Dirac-like function is characterized by a dominant pulse. Secondary maxima should be distinctly smaller in amplitude than this dominant pulse, for example, less than half. The Dirac-like functions are generated by reserved carriers, which can no longer be used for data transmission. This means that these carrier positions are at first set at zero. By iteration, this Dirac-like function, occupying only the reserved carriers, weighted with an amplitude factor, which is proportional to the difference between the maximum peak value $x_m$ and the desired maximum value $x_{target}$, is then subtracted in the temporal domain. The Dirac-like function is cyclically displaced to the position of the maximum value. The displacement law of the DFT transformation makes sure that only the reserved carriers are still occupied even after displacement. Thus, the sequence of the Tellado method is as follows:

Step No. 1: Initialization of X as data vector in the DFT domain, setting the reserved carriers at zero Step No. 2: Initialization of the temporal domain vector $x^{(0)}$ being altered by iteration with x=IFFT(X)

Step No. 3: Search for the maximum value $x_m^{(i)}$ and the corresponding position m within the vector x:

$$|x_m^{(i)}|=\max_k|x_k^{(i)}|$$

Step No. 4: If $|x_m^{(i)}|<x_{target}$ or if $i>i_{max}$, the end of the iterations has been reached and it occurs from $x^{(i)}$; otherwise:

Step No. 5: Modification of the temporal domain vector according to the iteration rule:

$$x^{(i+1)}=x^{(i)}-\alpha(x_m^{(i)}-\text{sign}(x_m^{(i)})x_{target})(p\to m)$$

$$i=i+1$$

Again search for the maximum value etc., cf. steps 3 and 4.

Here, i designates the iteration counter (i=0,1,2 . . . ) and p (p→m) the Dirac-like function that is cyclically displaced to the position m.

The method proposed by Tellado works only in the temporal domain and is therefore characterized by very little complexity. A drawback of the method thus far has been that subsequent filter functions could not be suitably provided for. These filters, which are actually almost always present in practice, increase the ratio of the peak-to-average value once again and thus negate a portion of the reduction itself.

It is therefore the object of the invention to create a remedy here and to specify a method for the transmission of data with multicarrier transmission using a plurality of carrier frequencies, wherein the resulting high peak values of the temporal signal are reduced by iteration, and analog and digital filter functions are taken into account.

The method of the invention, of the kind mentioned at the outset, is accordingly characterized in that the temporal functions are generated such that the Dirac-like temporal functions obtained after the filtering have their maxima in an oversampled temporal resolution at different, preferably neighboring locations, both the oversampled Dirac-like temporal functions after the filtering and the corresponding non-oversampled filter input functions are saved in memory, and from the pairs of stored temporal functions or filter input functions one selects a pair by iteration, which is displaced by applying the displacement law to the location of a peak value brought about by a data occupancy of the remaining carriers, including interactive modifications which have already occurred, and it is then subtracted from the temporal signal after being weighted with a factor, the iterative modifications being applied in parallel to the temporal signal in the oversampled grid after filtering and to the corresponding temporal signal without oversampling and without filtering. With this procedure, the aforesaid object is achieved in advantageous manner, and a substantial reduction of the high peak values in the signal-to-average value ratio becomes possible, even when subsequent filter functions are taken into account. Although the time for the signal processing is somewhat longer due to the oversampling, this really has no detrimental impact in practice.

Experiments have shown that, when using the method of the invention, an oversampling by a factor of, say, L=4 produces good results, and at least 10 iterations (but often even fewer) are sufficient in the iterative signal processing.

The number of iterations is advisedly determined by assigning a threshold value, chosen according to the desired signal quality, and in this connection an advantageout embodiment of the method according to the invention is characterized in that the data, after all values of the oversampled time functions exceed a maximum number of iterations, or after they fall below a preassigned threshold, are output by transferring the non-oversampled temporal function through physical filter arrangements.

As regards the oversampling which is characteristic of the technique according to the invention, it has furthermore been found to be advantageous for the set of oversampled Dirac-like temporal functions to have maxima which are neighboring in time, selected by m mod L during the iterative processing and cyclically displaced by [m/L] timing units (normal sampling grid) or L·[m/L] timing units (oversampled), where m indicates the maximal position in the oversampled cycle and L is the oversampling.

For an efficient iteration in the scope of the method according to the invention, it is furthermore advantageous for the factor used to weight the displaced function pair during the iterative processing to be formed by a step width ($\alpha$) and be defined by the oversampled temporal signal ($\tilde{x}_m^{(i)}$) exceeding a predetermined threshold ($x_{target}$).

The method of the invention can be used to advantage both for a data transmission by cable or for a wireless transmission. In regard to the base band transmission used during a transmission by cable, as a further modification of the invention it is preferably stipulated that the carriers reserved for a wire-line transmission of data be chosen pairwise, corresponding to complex-conjugated pairs in the DFT domain.

Summarizing, therefore, in order to reduce the ratio of the peak-to-average value in the technique of the invention, individual carriers are not occupied by data, and instead these carriers are used to define Dirac-like temporal functions. Several pairs of such temporal functions are used, and each time one function includes a real existing filter function, oversampled, while the other function represents the corresponding non-oversampled temporal function without filtering. Sets of functions are stored in memory, having neighboring maxima in the oversampled grid, and in an iteration process oversampled and non-oversampled temporal functions, which are first initialized by the occupied data carriers after the IFFT transformation with and without filtering, are modified in parallel by subtraction of the stored weighted Dirac-like functions. By cyclical displacement, the maximum of the Dirac-like function is made to overlap a peak of the temporal signal that is being reduced. For the subtraction, one of the Dirac-like function pairs is selected and weighted with a step width and the exceeding of a predetermined amplitude threshold. After the iteration sequence is completed, the non-oversampled signal is output to the following transmitting stages, especially the physical filters.

Figure 4:
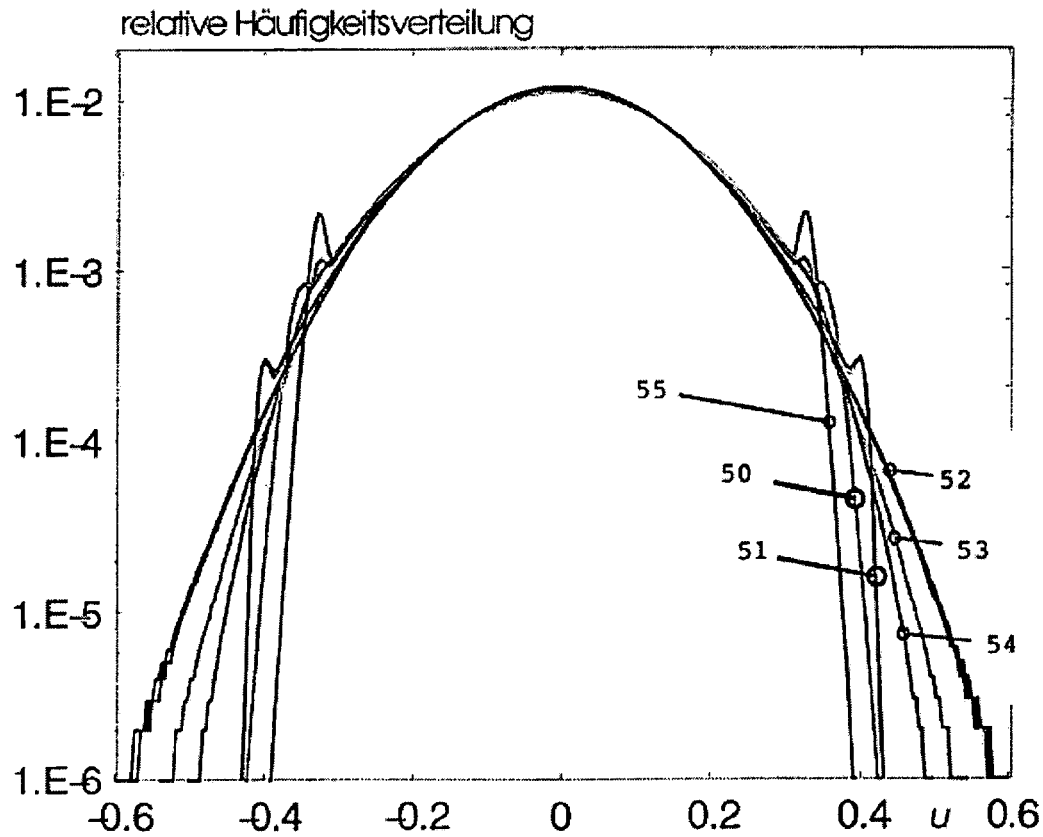
Figure 2:
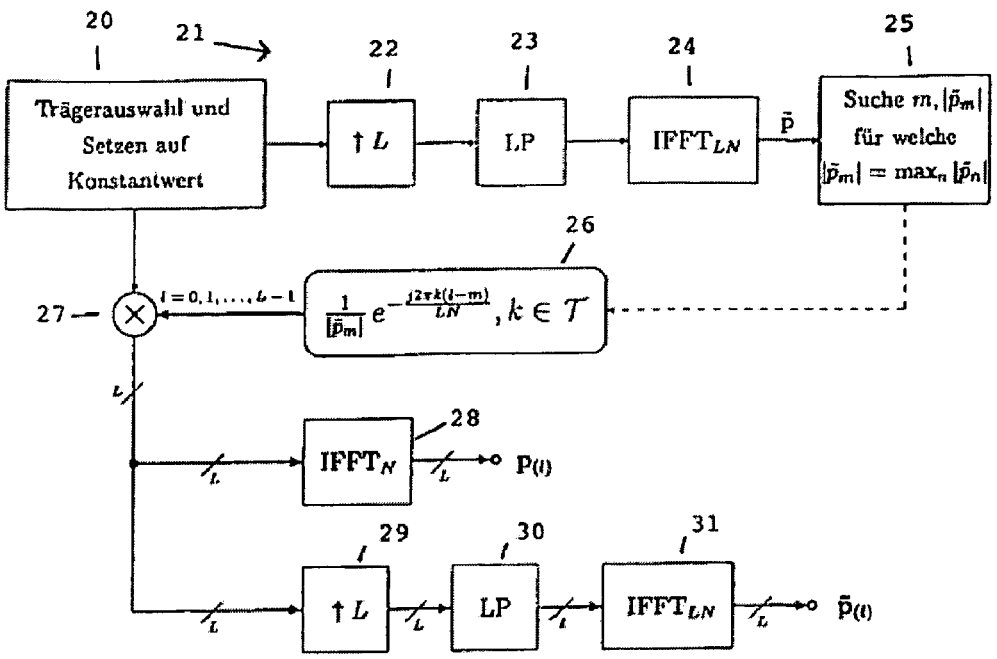
Figure 3:
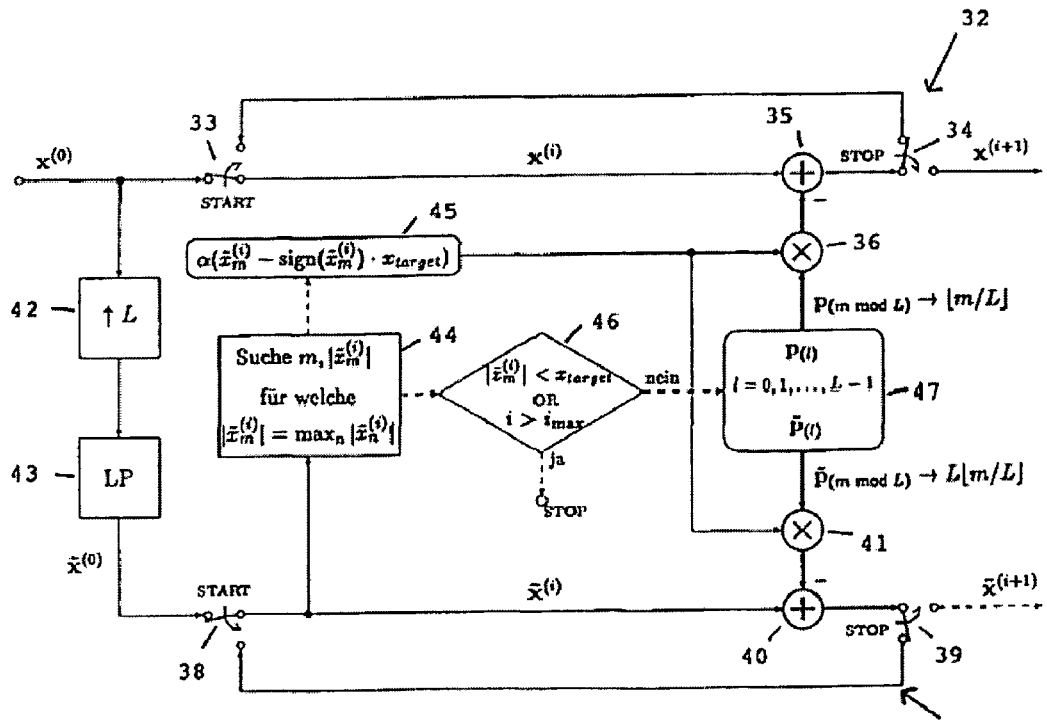
Figure 5:
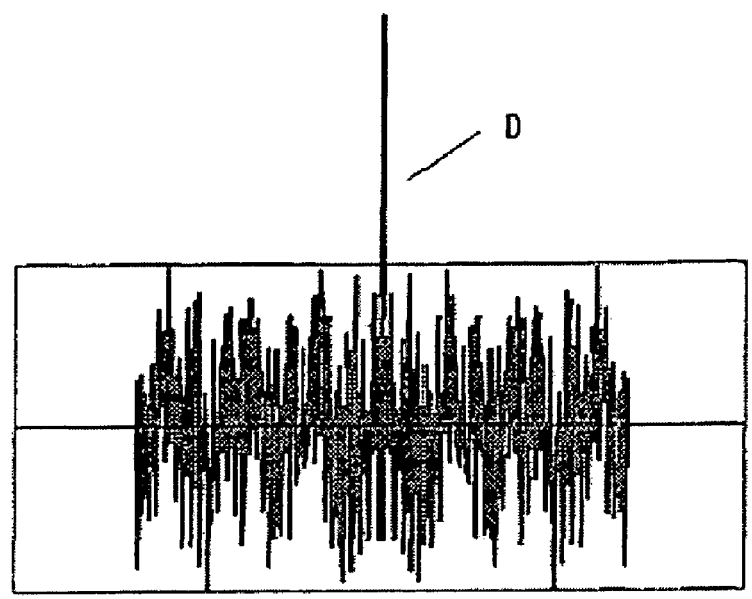

The invention shall now be explained further by means of embodiment examples making reference to the drawing, which shows:

FIG. 1, a block diagram of a transmission device with a transmitter (FIG. 1a) and a receiver (FIG. 1b) to carry out the method of the invention;

FIG. 2, in a diagram, the generating of the two function sets used in the method of the invention, namely, one of Dirac-like feed functions and one of corresponding oversampled temporal functions;

FIG. 3, in a comparable diagram, the parallel signal processing stipulated in the method of the invention, namely, of the non-oversampled temporal function and the oversampled temporal function;

FIG. 4, in a diagram, the relative frequency distribution (or density) plotted against a normalized voltage when using the method according to the invention as compared to known techniques;

FIG. 5, a diagram of a Dirac-like function; and

Figure 6:
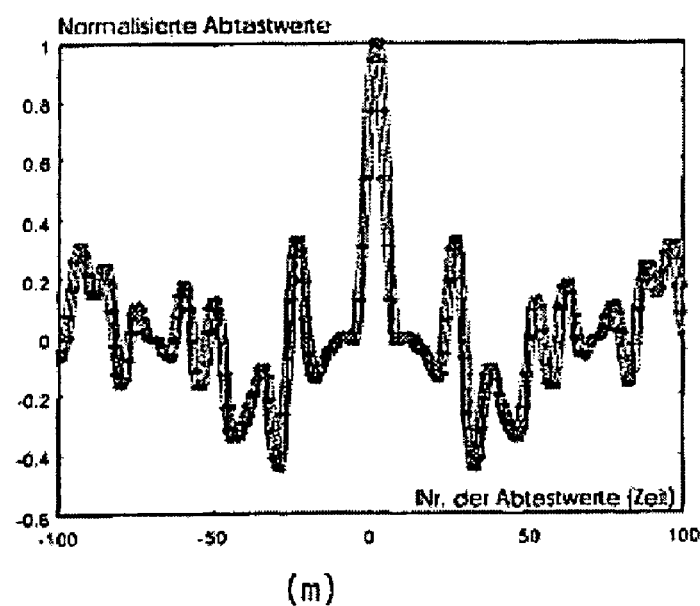

FIG. 6, a diagram of a Dirac-like temporal function with a maximum at neighboring locations in an oversampled temporal resolution.

FIG. 1 shows the basic arrangement of transmitter 2 and receiver 3 of a DMT transmission device 1, wherein unimportant components are not represented. Since the expansion by the Guard Interval, as mentioned, plays no part in the technique according to the invention, this is likewise omitted from FIG. 1.

In the transmission device 1 shown in FIG. 1, the transmitter 2 has a serial-parallel converter 4; a bit allocation module 5 for allocating bits to the carriers, wherein individual carriers are occupied with zero for the method according to the invention; a QAM mapping module 6 for assigning the QAM points, wherein again the reserved carriers are set at zero; an IFFT module 7, which represents the actual modulation; a PAR reduction module 8; a parallel-serial converter 9; and an output unit 10 with filter function.

The receiver 3, on the other hand, contains: a reception filter 11; a parallel-serial converter 12; an FFT module 13 for the demodulation; a QAM demapping module 14 for the reverse assignment of the QAM points to bits, wherein the nonoccupied carriers are not evaluated; and a serial-parallel converter 15 for outputting the data.

The components 4-15 evident in FIG. 1 are essentially conventional components, which can also be realized through software, and they are organized appropriately to carry out the method according to the invention; this applies, in particular, to the PAR reduction module 8, whose function shall be described hereafter in detail.

In the transmission method according to the invention, unlike the prior art, provision is made for (any desired) filter functions, without this significantly impairing the reduction of the crest factor. For this purpose, when initializing the temporal domain vector x being altered by iteration, a longer IDFT transformation is used, allowing a more precise temporal resolution. Let the IDFT length used be LN, wherein N is the original transformation length. Instead of only one Dirac-like function p, in the method of the invention we use L such functions, having directly neighboring peak values in the higher temporal resolution if possible. The filter function is already considered when establishing these Dirac-like functions. For this, the reserved places of a Dirac-like function in the DFT domain are determined such that the desired Dirac-like form is present downstream of the filter (10 in FIG. 1)—not necessarily also upstream of the filter. The additional L-1 displaced Dirac-like functions are obtained, for example, by using the displacement law, and this can always be accomplished by the reserved carriers, despite the higher temporal resolution. By IFFT transformations of the original length N, the method of the invention then computes a set of Dirac-like feed functions and, at the same time—by IFFT transformations of the length LN after factoring in the filter function in the DFT domain—the corresponding oversampled temporal functions at the filter output. Both sets of functions are processed in parallel in the present iterative method. In this way, in addition to the signal processes after the filtering, one simultaneously obtains the transmitting processes in the original sampling grid, which thereafter move through the actual physical filter 10, when the iterations—carried out in module 8 of FIG. 1—are completed.

FIG. 2 shows the generating of the two function sets in detail. The selection of the reserved carriers (frequencies) for a Dirac-like function in the oversampled temporal domain is localized in block 20. The upper branch 21 with a block 22 illustrating the oversampling by L, the filter simulation (LP) at block 23, the expanded IFFT of length LN at block 24, and the searching for the maximum at block 25 serves to determine the position of the maximum in the oversampled temporal domain, in order to then shift the maximum to the zero position in the shift operation in the DFT domain (application of the displacement law), indicated by block 26, and then (at 27) to generate also the L twice-displaced Dirac-like functions. This occurs in the DFT domain and only influences the reserved carriers. The division by $|\tilde{p}_m|$ at block 26 is done for normalization. Moreover, an IFFT of the original length (IFFT) N is shown at block 28, which creates the feed functions in the original cycle $p_{(l)}$, with $l=0,\ldots,L-1$, which are then required in the iteration algorithm described further hereafter, in order to form the temporal signal finally fed to the physical filter. The corresponding oversampled Dirac-like signals $\tilde{p}_{(l)}$, with $l=0,\ldots,L-1$, are computed by the oversampling (L) at block 29, the filter simulation in the DFT domain (LP) shown at block 30, and finally by the expanded IFFT transformation of length LN, shown at block 31.

In the method of the invention, as in the method of Tellado, one searches for the maximal position m, although this is done in the oversampled higher temporal resolution. The modulo operation m mod L then serves to select the Dirac-like functions in parallel in the oversampled version and in the version in the original sampling grid. After selecting the function pair, a displacement by [m/L] occurs in the original sampling grid and by L·[m/L] in the oversampled grid in the method of the invention, in order to shift the maximum of the Dirac-like functions to the desired position. (By [ ] is meant so-called Gauss brackets, which signify a rounding off). The modification by the selected and shifted Dirac-like functions occurs in parallel in the oversampled and the normal sampling grid. As in the Tellado method, the functions are weighted with a step width α and the increment that exceeds the threshold.

FIG. 3 shows the parallel processing of the method according to the invention. The upper branch 32, consisting of switches 33 (START), 34 (STOP), an addition 35 and a multiplication 36, shows the iterative changing of the non-oversampled temporal function, while the lower branch 37 with switches 38 (START), 39 (STOP), an addition 40 and a multiplication 41 carries out the corresponding modification in the oversampled temporal grid. The oversampling (L) of the original temporal functions formed by the user data, which is done at block 42, is followed by the simulation of an actual physical filter (LP), indicated at block 43. However, this simulation can also occur already in the DFT domain, as an alternative, so that the two temporal functions $x^{(0)}$ and $\tilde{x}^{(0)}$ can then be generated in parallel with IFFT transformations of lengths N and LN. In FIG. 3, only the temporal domain simulation of the filter is shown. The search for the maximal position indicated at block 44 and the weighting illustrated at block 45 correspond, in the method of the invention, basically to the above-described steps No. 3 and No. 5 of the Tellado method, albeit these steps in the method according to the invention occur in the oversampled time cycle. The polling of the method according to the invention, indicated at 46, corresponds to step No. 4 of the Tellado method. The pairs of Dirac-like sample functions, determined by the portion of the method as described by FIG. 2, are kept in a memory, cf. block 47 in FIG. 3, selected according to the determined maximal position m by m mod L, controlled by the branching, i.e., polling 46, and displaced by [m/L] or L [m/L].

Using practical examples from the field of wire-line transmission engineering, an FFT length of N=512 is customary for ADSL (Asymmetrical Digital Subscriber Line) and an FFT length of N=8192 for VDSL (Very high-speed Digital Subscriber Line). Practical experiments have revealed that L=4 is sufficient as the oversampling. Corresponding examples in the wireless field are DAB (Digital Audio Broadcasting), DVB (Digital Video Broadcasting), HIPERLAN 2 (Wireless LAN), the first two methods being of special interest on account of the rather large number of carriers, several thousand. Although we have selected examples from wire-line transmission engineering, the method is also quite conceivable for applications in wireless. Differences between the cable and the wireless application consist in the fact that there is a base band transmission with cable, in which case complex-conjugated pairs always need to be considered in the DFT domain, whereas this is not so in wireless. This also means, in particular, that the carriers reserved for the method of the invention should always be selected in pairs for the cable application (step 20 in FIG. 1). The required number of reserved carriers is around 5%. The greatest PAR reduction occurs in the first iterations. More than 20 iterations hardly make sense, and often 10 iterations will suffice.

FIG. 4 shows the relative frequency distributions of the transmitting voltages, which are depicted here as normalized voltages u, when using the method of the invention for two different parameter sets $x_{target}$ and α, namely, (1): $x_{target}$=8, α=0.5 (curve 50), and (2): $x_{target}$=9.5, α=0.7 (curve 51) as compared to the results without any limiting of peak value and using the original method of Tellado, i.e., without oversampling. Curves 52 show the parabola of the Gauss-like frequency distribution without employing a peak value limitation, and curves 53 and 54 the results in the Tellado method with subsequent filtering by a rectangular and an ADSL-like (ITU-T G.996.1) transfer function, respectively. The results with the method of the invention according to curves 50 and 51 differ only in the choice of the parameters $x_{target}$ and α. Curve 55, finally, shows results with the Tellado method, i.e., without oversampling, without any filtering. This result thus reflects a lower limit on the ratio of the peak-to-average value, which is practically unachievable with the existing follow-up filtering. As can be seen, however, the results achieved according to the invention for curves 50, 51 come rather close to this result.

Finally, for example, FIG. 5 illustrates a segment of a Dirac-like function, in which a dominant pulse D is present, which is distinctly larger (e.g., more than twice as large) than the secondary maxima in the function.

FIG. 6, finally, illustrates a function plot for the Dirac-like temporal functions obtained after the filtering, in which normalized sampled values are plotted against the numbers of the sampled values (as a measure of the time), while the maxima exist at neighboring locations (in the oversampled temporal resolution).

Thus, briefly put, in the described method for data transmission by multicarrier modulation, in order to reduce the ratio of the peak-to-average value, individual carriers are not occupied with data and instead are used for defining of Dirac-like temporal functions, making use of pairs of such temporal functions, and each time one function includes an actually existing filter function, oversampled, while the other function represents the corresponding non-oversampled temporal function without filtering. Sets of functions are saved in memory, possessing neighboring maxima in the oversampled grid, and in an iterative procedure one modifies in parallel oversampled and non-oversampled temporal functions ($\tilde{x}$, x), which are at first initialized by the occupied data carriers after IFFT with and without filtering, by subtracting the stored and weighted Dirac-like functions. Cyclical shifting brings the maximum of the Dirac-like function $\tilde{p}_{(l)}$ to overlap a peak being reduced at location m of the temporal signal $\tilde{x}^{(l)}$. In the subtraction, one of the Dirac-like function pairs is selected and weighted with a step width (α) and the increment exceeding a given amplitude threshold. After the end of the iteration sequence, the non-oversampled signal is output to the following transmission stages, especially the physical filters.

The invention claimed is:

1. In a method of transmitting data by multicarrier modulation, wherein the data at a transmitter side are assembled into blocks and modulated block by block with an Inverse Discrete Fourier Transformation and wherein several carriers are reserved, not being occupied with data, and the carriers are used to define a group of temporal functions that is generated which result in Dirac-like temporal functions after a filtering, the improvements comprising:

generating the temporal functions such that the Dirac-like temporal functions obtained after the filtering have maxima in an oversampled temporal resolution at neighboring locations, saving both oversampled Dirac-like temporal functions ($\tilde{X}^{(O)}$) after the filtering and corresponding non-oversampled filter input functions ($x^{(O)}$) in memory in pairs, and selecting from the pairs of saved oversampled Dirac-like temporal functions and non-oversampled filter input functions a pair that has a maximum of an oversampled temporal function at a predetermined location (m) of an oversampling grid, wherein during each step of an iterative computation, a displacement law is applied to shift each time a pair of an oversampled temporal function and a corresponding filter input function to a location of a peak value produced by a data occupation of the remaining carriers and then the pair of the oversampled temporal function and the corresponding filter input function is weighted with a factor (α) and subtracted from the pair of the oversampled temporal function and the corresponding filter input function of a moment, and modifications resulting from iterative computations already performed are also considered as temporal or input functions, and wherein the iterative modifications are applied in parallel to the oversampled temporal functions ($\tilde{X}^{(O)}$) after the filtering and to the corresponding non-oversampled filter input functions ($x^{(O)}$).

2. The method according to claim 1, wherein the data, after all values of the oversampled temporal functions exceed a maximum number ($i_{max}$) of iterations or fall below a preassigned threshold ($x_{target}$), are output by transferring the non-oversampled temporal function across physical filter arrangements.

3. The method according to claim 1, wherein the oversampled Dirac-like temporal functions are selected by m mod L during the iterative computation, and the non-oversampled filter input functions are cyclically shifted by [m/L] clock units and the oversampled temporal functions by L·[m/L] clock units, where m is the maximal position in the oversampled cycle and L is the oversampling.

4. The method according to claim 1, wherein the factor (α) used to weight the shifted pair of functions during the iterative processing is formed by a step width and the exceeding of a predetermined threshold ($x_{target}$) is defined by the oversampled temporal signal ($\tilde{X}_m^{(i)}$).

5. The method according claim 1, wherein, for a wire-line transmission of data, the reserved carriers are selected in pairs, corresponding to complex-conjugated pairs in a Discrete Fourier Transformation (DFT) domain.

6. The method according to claim 2, wherein the oversampled Dirac-like temporal functions are selected by m mod L during the iterative computation, and the non-oversampled filter input functions are cyclically shifted by [m/L] clock units and the oversampled temporal functions by L·[m/L] clock units, where m is the maximal position in the oversampled cycle and L is the oversampling.

7. The method according to claim 2, wherein the factor (α) used to weight the shifted pair of functions during the iterative processing is formed by a step width and the exceeding of a predetermined threshold ($x_{target}$) is defined by the oversampled temporal signal ($\tilde{X}_m^{(i)}$).

8. The method according to claim 3, wherein the factor (α) used to weight the shifted pair of functions during the iterative processing is formed by a step width and the exceeding of a predetermined threshold ($x_{target}$) is defined by the oversampled temporal signal ($\tilde{X}_m^{(i)}$).

9. The method according to claim 2, wherein, for a wire-line transmission of data, the reserved carriers are selected in pairs, corresponding to complex-conjugated pairs in a Discrete Fourier Transformation (DFT) domain.

10. The method according to claim 3, wherein, for a wire-line transmission of data, the reserved carriers are selected in pairs, corresponding to complex-conjugated pairs in a Discrete Fourier Transformation (DFT) domain.

11. The method according to claim 4, wherein, for a wire-line transmission of data, the reserved carriers are selected in pairs, corresponding to complex-conjugated pairs in a Discrete Fourier Transformation (DFT) domain.

12. The method according to claim 6, wherein the factor ($\alpha$) used to weight the shifted pair of functions during the iterative processing is formed by a step width and the exceeding of a predetermined threshold ($x_{target}$) is defined by the oversampled temporal signal ($\widetilde{X}_m^{(i)}$).

13. The method according claim 6, wherein, for a wire-line transmission of data, the reserved carriers are selected in pairs, corresponding to complex-conjugated pairs in a Discrete Fourier Transformation (DFT) domain.

14. The method according claim 7, wherein, for a wire-line transmission of data, the reserved carriers are selected in pairs, corresponding to complex-conjugated pairs in a Discrete Fourier Transformation (DFT) domain.

15. The method according claim 8, wherein, for a wire-line transmission of data, the reserved carriers are selected in pairs, corresponding to complex-conjugated pairs in a Discrete Fourier Transformation (DFT) domain.

16. The method according claim 12, wherein, for a wire-line transmission of data, the reserved carriers are selected in pairs, corresponding to complex-conjugated pairs in a Discrete Fourier Transformation (DFT) domain.

17. The method according to claim 1, wherein the maxima are neighboring in time and the function of the filter is already considered when establishing the Dirac-like temporal functions.

* * * * *